United States Patent
Kim et al.

(10) Patent No.: US 12,379,995 B2
(45) Date of Patent: Aug. 5, 2025

(54) DATA STORAGE DEVICE INCLUDING A SOLID STATE DRIVE

(71) Applicants: SK hynix Inc., Icheon (KR); Seoul National University R&DB Foundation, Seoul (KR)

(72) Inventors: Minwook Kim, Seoul (KR); Jinsoo Kim, Seoul (KR); Ikjoon Son, Icheon (KR); Euidong Lee, Icheon (KR)

(73) Assignees: SK hynix Inc., Icheon-si (KR); Seoul National University R&DB Foundation, Seoul (KR)

( * ) Notice: Subject to any disclaimer, the term of this patent is extended or adjusted under 35 U.S.C. 154(b) by 16 days.

(21) Appl. No.: 18/349,074

(22) Filed: Jul. 7, 2023

(65) Prior Publication Data
US 2024/0289222 A1  Aug. 29, 2024

(30) Foreign Application Priority Data

Feb. 27, 2023 (KR) .................. 10-2023-0025620

(51) Int. Cl.
  *G06F 11/10*  (2006.01)
  *G06F 13/16*  (2006.01)

(52) U.S. Cl.
  CPC ........ *G06F 11/108* (2013.01); *G06F 11/1084* (2013.01); *G06F 13/1673* (2013.01)

(58) Field of Classification Search
  CPC .............. G06F 11/108; G06F 11/1084; G06F 13/1673; G06F 11/1076
  USPC ....................................................... 714/6.24
  See application file for complete search history.

(56) References Cited

U.S. PATENT DOCUMENTS

| | | | |
|---|---|---|---|
| 2003/0120864 A1 | 6/2003 | Lee et al. | |
| 2008/0093926 A1* | 4/2008 | Suzuki | G06F 1/26 307/19 |
| 2020/0379668 A1* | 12/2020 | Akaike | G06F 3/067 |
| 2021/0405918 A1* | 12/2021 | Li | G06F 12/0882 |

FOREIGN PATENT DOCUMENTS

KR  1020130092482 A  8/2013

OTHER PUBLICATIONS

Javier González, "Zoned Namespaces", SDC SNIA EMEA 20, 2020.
Tzi-cker Chiueh et al "Software Orchestrated Flash Array" ACM SYSTOR, Jun. 10-12, 2014, Haifa, Israel.
Jaeho Kim et al. "Alleviating Garbage Collection Interference Through Spatial Separation in All Flash Arrays" 2019 USENIX Annual Technical Conference, Jul. 10-12, 2019, Renton, WA, USA.

* cited by examiner

*Primary Examiner* — Yair Leibovich

(57) ABSTRACT

A data storage device comprises a disk array including a plurality of disks; and a redundant array of independent disks (RAID) controller configured to manage the disk array according to a RAID mode, wherein each of the plurality of disks includes: a nonvolatile memory device having a plurality of zones of which supports a sequential write operation; and a random write buffer associated to one of the plurality of zones, the random write buffer having a start address that is indicated by a write pointer, the write pointer indicating a location where a next write operation is to be performed.

17 Claims, 13 Drawing Sheets

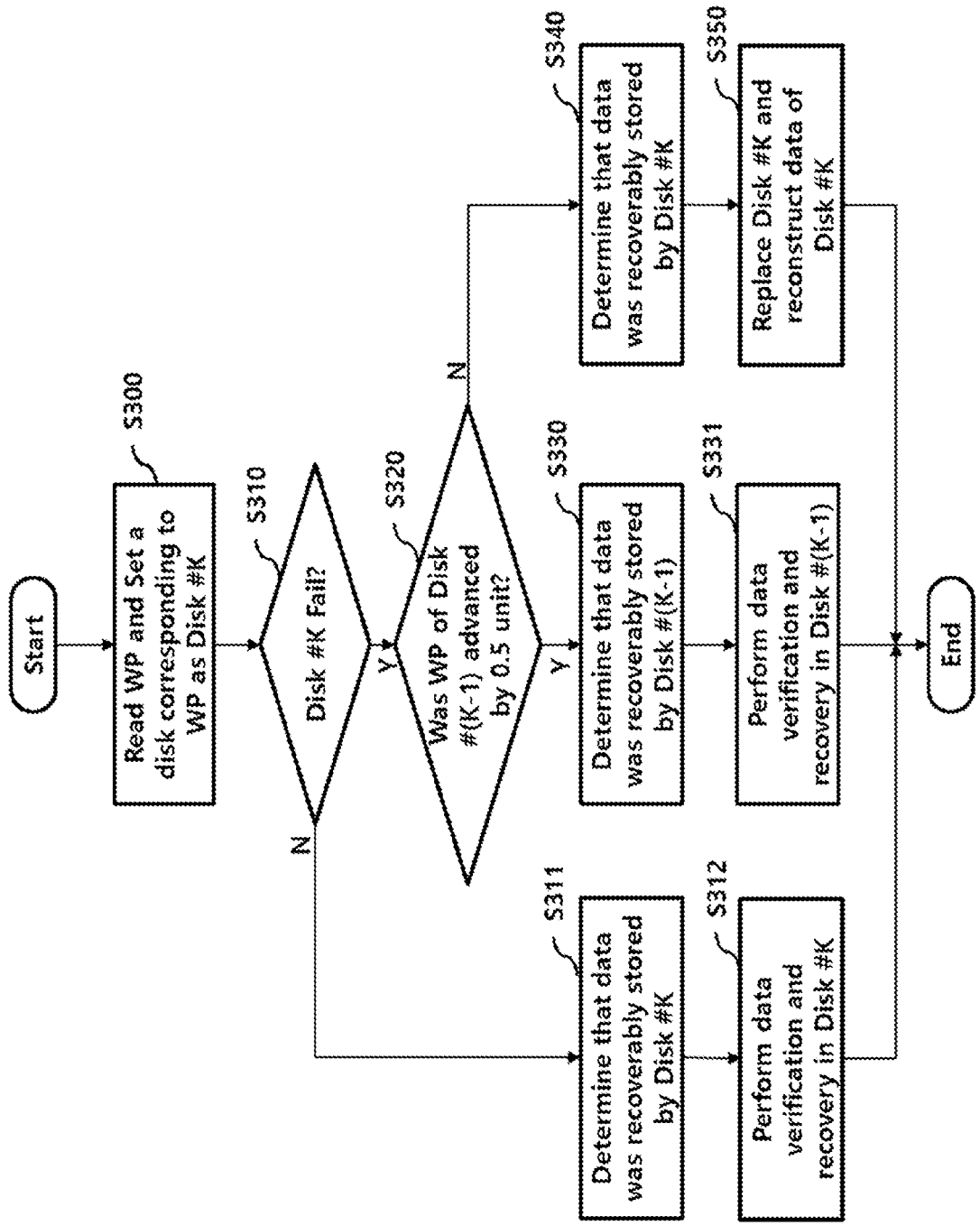

DATA STORAGE DEVICE INCLUDING A SOLID STATE DRIVE

CROSS-REFERENCE TO RELATED APPLICATIONS

The present application claims priority under 35 U.S.C. § 119(a) to Korean Patent Application No. 10-2023-0025620, filed on Feb. 27, 2023, which is incorporated herein by reference in its entirety.

BACKGROUND

1. Technical Field

Embodiments relate to a data storage device including a solid state drive (SSD), and more particularly, to a data storage device including a plurality of SSDs according to redundant array of independent disks (RAID) technology.

2. Related Art

RAID technology is a technology that combines multiple disks into a single storage device where data may be recovered even if some of the multiple disks are damaged.

The minimum unit of data recovery is a stripe, and chunks constitute the stripe. The chunks are stored one by one on the multiple disks.

There are various modes in the RAID technology, such as RAID 0, RAID 1, RAID 4, RAID 5, and RAID 6.

Among them, RAID 4, RAID 5, and RAID 6 are parity-based modes, where a stripe includes a parity chunk that stores parity for other chunks.

At this time, in one stripe, a parity chunk corresponds to a result of performing an XOR operation on other chunks, which is referred to as an XOR operation result, and if an error occurs in one disk, a chunk stored in the disk can be restored from the XOR operation result.

A zoned namespace (ZNS) SSD is proposed as a next-generation SSD, and a RAID data storage device including a plurality of ZNS SSDs is being studied.

In the prior art, if one stripe is completely filled with chunks, there is no difficulty in recovering a damaged chunk using a parity chunk therein.

In the prior art, a parity chunk is stored when one stripe is completed, i.e., when the one stripe is filled with chunks. Therefore, if a disk failure occurs before the one stripe is completed, data of the incomplete stripe cannot be restored.

In order to solve this problem, partial chunk information for the incomplete stripe may be stored as metadata in a separate zone, which causes an overhead that is required to manage the metadata in the separate zone. Therefore, performance degradation may occur.

SUMMARY

In accordance with an embodiment of the present disclosure, a data storage device may comprise a disk array including a plurality of disks; and a redundant array of independent disks (RAID) controller configured to manage the disk array according to a RAID mode, wherein each of the plurality of disks includes: a nonvolatile memory device having a plurality of zones each of which supports a sequential write operation; and a random write buffer associated to one of the plurality of zones, the random write buffer having a start address that is indicated by a write pointer, the write pointer indicating a location where a next write operation is to be performed.

In accordance with an embodiment of the present disclosure, a method of operating a data storage device including a plurality of disks, the method may comprise writing a data chunk in a random write area of a disk corresponding to a disk variable K, K being an integer; determining whether the disk variable K is smaller than N−1, N being a positive integer; when the disk variable K is smaller than N−1, writing a partial parity corresponding to written data chunks in a random write area of a disk corresponding to a disk variable (K+2), advancing a write pointer of the disk corresponding to the disk variable K, increasing the disk variable K by 1, and repeating the writing and the determining until the disk variable K becomes equal to N−1; and when the disk variable K is equal to N−1, writing a full parity corresponding to the written data chunks in a random write area of a disk corresponding to a disk variable (K+1) and advancing the write pointer of the disk corresponding to the disk variable K, the write pointer indicating a location of the disk where a next write operation is to be performed, wherein the partial parity represents a parity generated when an available space to store additional data chunk is left in a stripe constituted by the plurality of disks, and the full parity represents a parity generated when no available space is left in the stripe.

In accordance with an embodiment of the present disclosure, a method of operating a data storage device including a plurality of disks, the method may comprise writing a data chunk in a random write area of a disk corresponding to a disk variable K, K being an integer; determining whether the disk variable K is smaller than N−3, N being a positive integer; when the disk variable K is smaller than N−3, writing a first partial parity and a second partial parity both corresponding to written data chunks in a random write area of a disk corresponding to a disk variable (K+2) and a random write area of a disk corresponding to a disk variable (K+3), respectively, advancing a write pointer of the disk corresponding to the disk variable K, increasing the disk variable K by 1, and repeating the writing and the determining until the disk variable K becomes equal to N−3; and when the disk variable K is equal to N−3, writing a first full parity and a second full parity both corresponding to the written data chunks in a random write area of a disk corresponding to a disk variable (K+1) and a random write area of a disk corresponding to a disk variable (K+3), respectively, and advancing the write pointer of the disk corresponding to the disk variable K, the write pointer indicating a location of the disk where a next write operation is to be performed, wherein the first and second partial parities represent a parity generated when an available space to store additional data chunk is left in a stripe constituted by the plurality of disks, and the first and second full parities represent a parity generated when no available space is left in the stripe.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments that include various features, and explain various principles and beneficial aspects of those embodiments.

FIG. 13 is a flowchart illustrating a data recovery operation of a RAID controller according to another embodiment of the present disclosure.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

Figure 1:
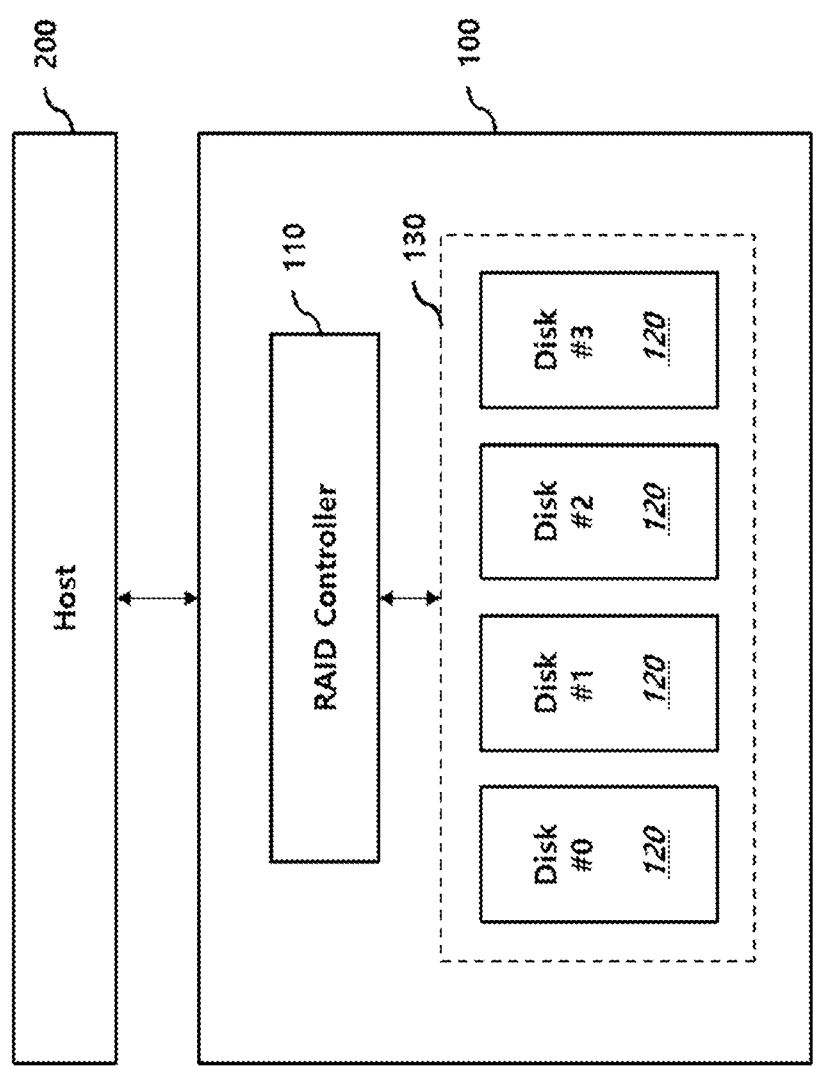
FIG. 1 illustrates a system including a data storage device according to an embodiment of the present disclosure.

FIG. 1 is a block diagram illustrating a system including a data storage device 100 according to an embodiment of the present disclosure. The system may further include a host 200.

The data storage device 100 includes a RAID controller 110 and a disk array 130 including a plurality of disks 120.

In this embodiment, it is assumed that the disk 120 is a ZNS SSD, and the RAID controller 110 controls the plurality of disks 120 to operate in a RAID mode RAID 4, RAID 5, or RAID 6.

Since a RAID control operation of the RAID controller 110 is well known, a detailed description thereof will be omitted.

Also, RAID 4 and RAID 5 basically have the same principle. However, RAID 4 stores parity on one fixed disk, and RAID 5 stores parity in a distributed manner on multiple disks.

Accordingly, an embodiment using RAID 5 or RAID 6 will be described below.

Figure 2:
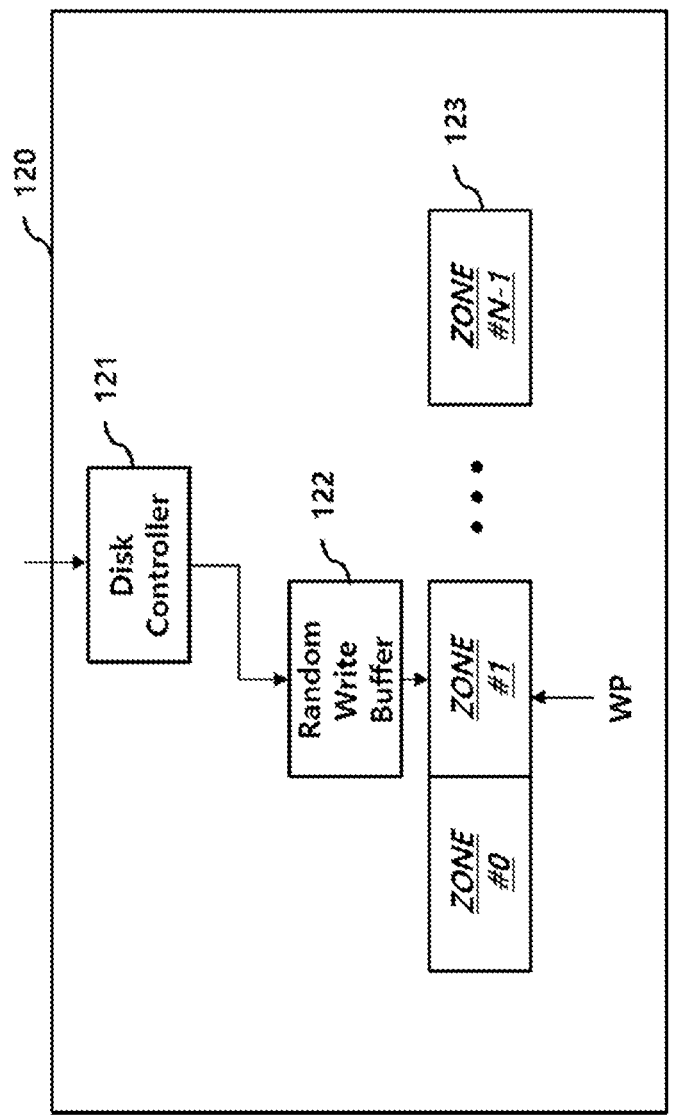
FIG. 2 illustrates a disk according to an embodiment of the present disclosure.

FIG. 2 is a block diagram showing a disk 120 according to an embodiment of the present disclosure. The disk 120 shown in FIG. 2 may correspond to each of the plurality of disks 120 of FIG. 1.

In this embodiment, the disk 120 is a ZNS SSD.

Since a basic configuration and operation of the ZNS SSD is well known, a detailed description thereof will be omitted.

The disk 120 includes a disk controller 121, a plurality of random write buffers 122, and a plurality of zones 123. For example, the plurality of random write buffers 122 correspond to the plurality of zones 123, respectively.

The disk controller 121 controls the random write buffer 122 and the zones 123 according to read, write, and erase requests provided by the RAID controller 110 of FIG. 1.

The zone 123 supports a sequential write operation.

The disk controller 121 manages a write pointer WP indicating an address from which the next write operation starts in the zone 123. In this embodiment, an address refers to a logical block address. Each zone can have a unique write pointer.

FIG. 2 shows a write pointer WP of zone #1 among N zones 123 included in the disk 120, N being a positive integer.

An address space in a zone 123 that is occupied by a random write buffer 122 is referred to as a random write area RWA. At this time, a start address of the random write area RWA coincides with a write pointer WP of the corresponding zone 123.

A random write operation and an overwrite operation can be performed in the random write area RWA.

Figure 3:
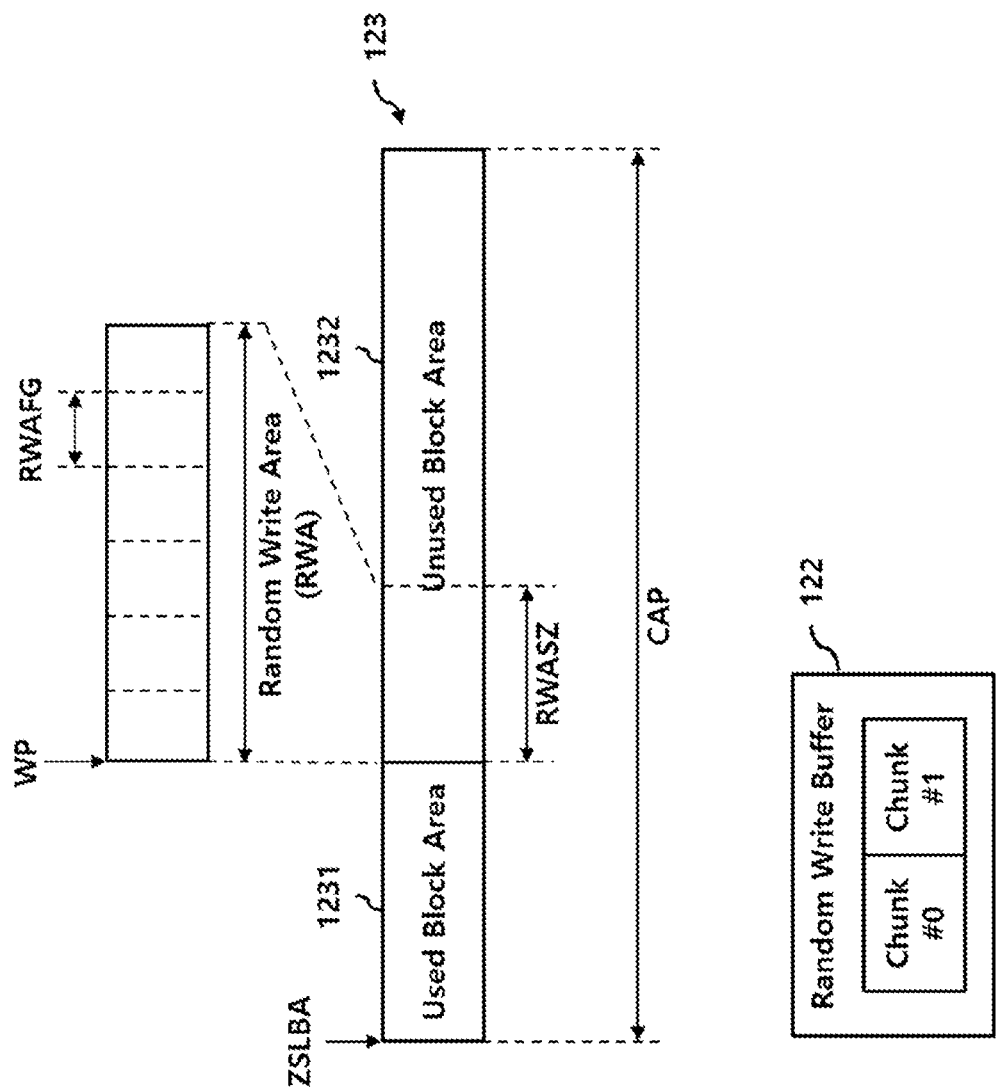
FIG. 3 illustrates an operation of a random write buffer according to an embodiment of the present disclosure.

FIG. 3 is an explanatory diagram showing a relationship between the random write buffer 122 and the zone 123 according to an embodiment of the present disclosure.

Since data is sequentially written in the zone 123, its address space includes a used block area 1231 and an unused block area 1232.

In FIG. 3, a start address of the zone 123 is indicated by ZSLBA, the size of the zone 123 by CAP, and the size of the random write area RWA by RWASZ.

In the middle of a write operation, the write pointer WP can be advanced inside the random write area RWA, and the advancement unit of the write pointer WP is indicated by RWAFG. In an embodiment, the advancement unit corresponds to a half size of a data chunk.

The write pointer WP can be advanced according to an external command, and this advancement of the write pointer WP is referred to as explicit advancement. At this time, the external command may be provided by the RAID controller 110.

The write pointer WP may be implicitly advanced when a write operation exceeding the size of the random write area RWA is performed. This advancement of the write pointer WP is referred to as implicit advancement.

The disk controller 121 of FIG. 2 updates write pointer information when the write pointer WP is advanced, and flushes data, corresponding to the advancement of the write pointer WP, from the random write buffer 122 to the unused block area 1232.

Accordingly, the used block area 1231 and the unused block area 1232 are updated, and the size of the random write area RWA is maintained constant.

In this embodiment, the plurality of zones 123 can be created using a non-volatile memory device such as a flash memory device.

The random write buffer 122 may be located in a separate physical storage space distinct from the plurality of zones 123, and may be implemented using a volatile or non-volatile memory device.

However, even in the case of implementing the random write buffer 122 with a volatile memory device such as a DRAM, it is desirable to maintain non-volatility of data stored in the random write buffer 122 while power is cut off.

In order to prevent loss of data, a capacitor for emergency power supply may be used. Since supplying power using the capacitor is well known, a detailed description thereof will be omitted.

In this embodiment, when a data write request is transmitted from the RAID controller 110 to the disk array 130, a unit of write requested data is represented as a chunk. One chunk may include one or more memory blocks.

In this embodiment, the RAID controller 110 divides and manages storage spaces of the plurality of disks 120 into a plurality of stripes, and one stripe includes a plurality of data chunks and one or two parity chunks.

The RAID controller 110 generates a parity chunk in the process of sequentially writing data chunks within a stripe.

Hereinafter, a parity generated when an available space to store additional data chunk is left in a stripe is referred to as a partial parity, and a parity generated when the stripe is full of data chunks is referred to as a full parity.

In the present embodiment, by using the random write area RWA when writing the partial parity and the full parity, it is possible to solve problems of complexity and waste of a data storage space that are caused when separate mapping is used to manage parity information in the prior art.

In this embodiment, the size of the random write buffer 122, that is, the size of the random write area RWA, is set to be twice the size of a data chunk, and two chunks corresponding to the random write area RWA may be referred to as a first chunk and a second chunk, respectively. In another embodiment, the size of the random write buffer 122 or the size of the random write area RWA is more than twice the size of the data chunk.

Hereinafter, using RAID 5 and RAID 6 as examples, a parity storage operation, an operation to advance a write pointer, and a data recovery operation in a process of writing a data chunk will be disclosed.

Figure 4:
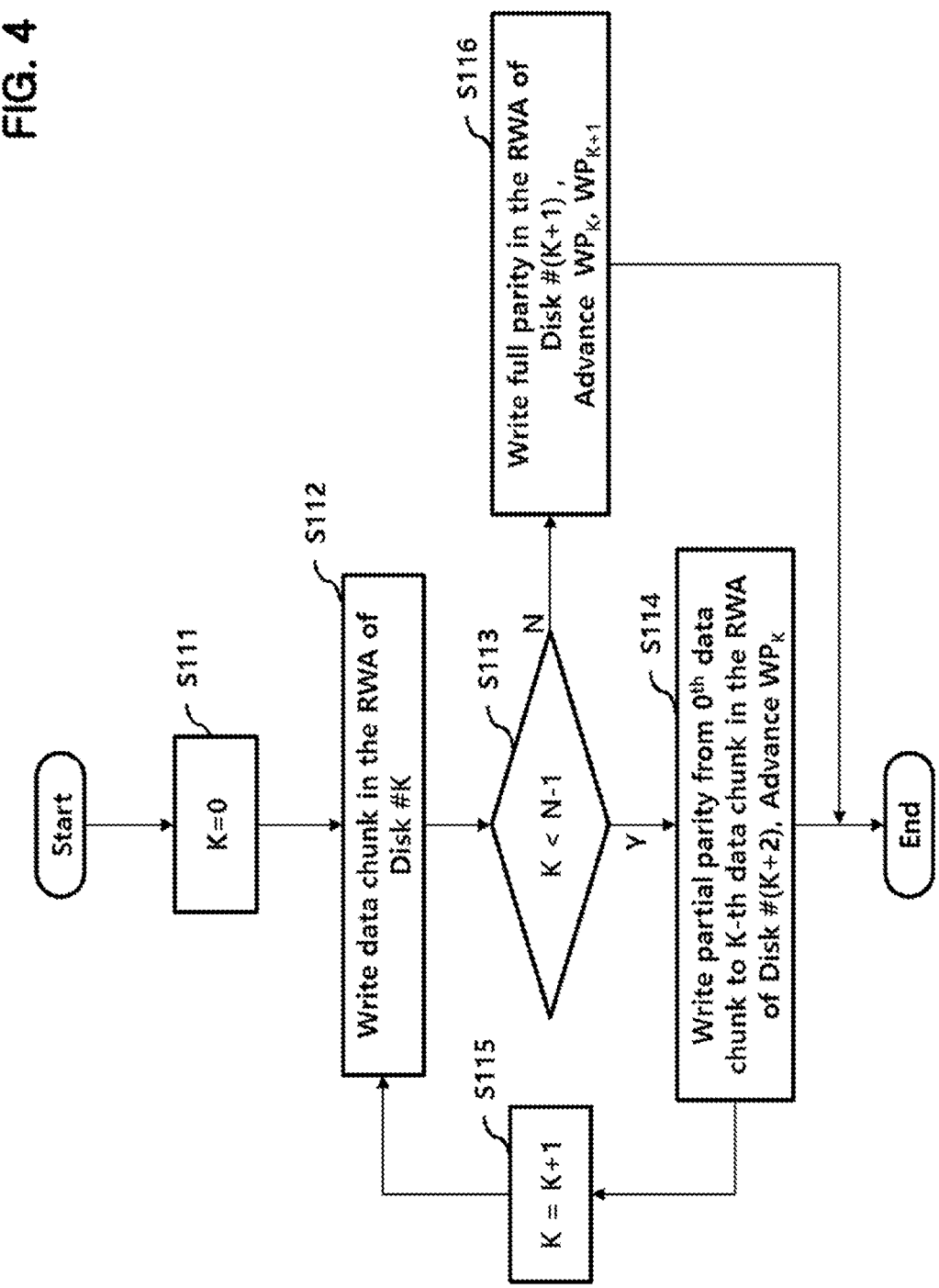
FIG. 4 is a flowchart illustrating a data write operation of a RAID controller according to an embodiment of the present disclosure.

FIG. 4 is a flowchart illustrating a data write operation of a RAID controller according to an embodiment of the present disclosure.

FIG. 4 shows a write operation performed in a first stripe in a RAID system operating in RAID 5.

In FIG. 4, it is assumed that a total number of chunks that can be stored in a stripe is N and up to (N−1) data chunks can be stored in the stripe, where N is greater than 2.

Figure 5:
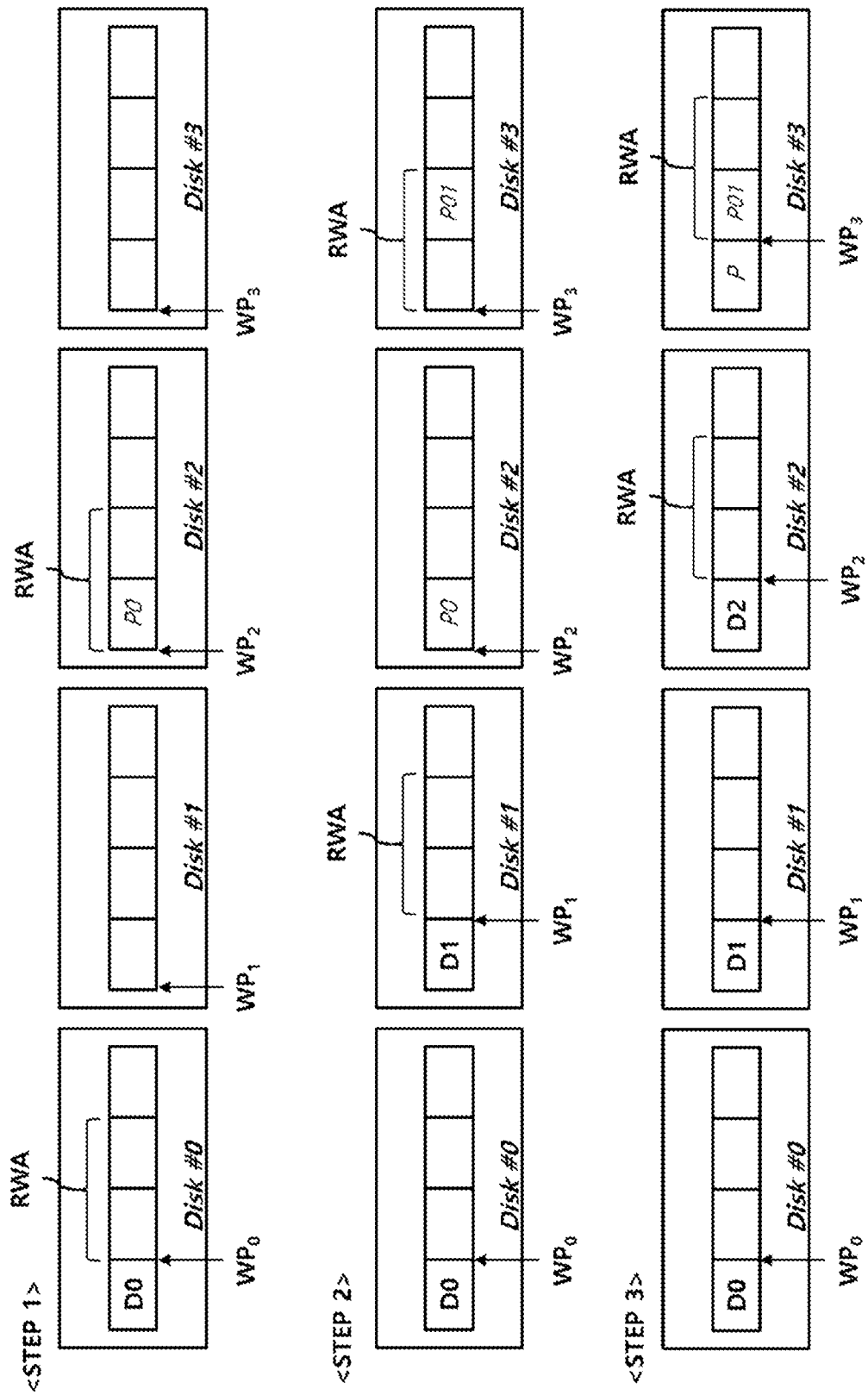
FIG. 5 illustrates a data write operation of a RAID controller according to an embodiment of the present disclosure.

FIG. 5 is an explanatory diagram for explaining the data write operation of FIG. 4 and corresponds to a case where N is 4. Hereinafter, the data write operation of FIG. 4 will be described with reference to FIG. 5.

First, a disk variable K is initialized to 0 at S111.

Thereafter, a data chunk is written or stored on a disk #K at S112.

Then, it is determined whether the disk variable K is smaller than N−1 at S113.

When the disk variable K is smaller than N−1, a partial parity is generated and stored, and then a write pointer $WP_K$ of the disk #K is advanced at S114.

When the partial parity is stored, a partial parity generated in the previous step should not be removed. If the partial parity generated in the previous step is removed, when an error occurs while writing data or a partial parity at the current step, data normally stored in the previous step is damaged and thus data integrity cannot be guaranteed.

The partial parity is generated by performing a logical operation on a data chunk #0 to a data chunk #K, and the logical operation is an XOR operation in the embodiment.

The partial parity is stored in a random write area RWA of a disk #(K+2). As described above, in this embodiment, the size of the random write area RWA corresponds to two data chunks.

In this embodiment, the partial parity is stored in a first chunk of the random write area RWA of the disk #(K+2).

Referring to FIG. 5, when a first data chunk D0 is stored in a first chunk of a random write area RWA of the disk #0 in STEP 1, a first partial parity P0 is stored in a first chunk of a random write area RWA of a disk #2. At this time, the first partial parity P0 is the same as the first data chunk D0.

In addition, in STEP 2 of FIG. 5, when a second data chunk D1 is stored in a first chunk of a random write area RWA of a disk #1, a second partial parity P01 is stored in a second chunk of a random write area RWA of a disk #3. At this time, the second partial parity P01 is the same as a result of an XOR operation performed on the first data chunk D0 and the second data chunk D1.

At this time, if the partial parity P0 or P01 is normally written, the write pointer $WP_K$ of the disk K is advanced.

If the write pointer $WP_K$ of the disk #K is advanced while the partial parity P0 or P01 is not normally written, when a failure occurs in the disk #K, the data stored on the disk #K cannot be recovered. Therefore, it is better to advance the write pointer $WP_K$ of the disk #K after the partial parity P0 or P01 is normally stored.

In STEP 1 and STEP 2 of FIG. 5, write pointers $WP_0$ and $WP_1$ of the disk #0 and the disk #1 are advanced, but write pointers $WP_2$ and $WP_3$ of the disk #2 and the disk #3 where the partial parities P0 and P01 are stored are not advanced.

FIG. 5 shows a state of random write areas RWA after write pointers are advanced.

After the write pointer $WP_K$ of the disk K is advanced at S114, the disk variable K is increased by 1 at S115, and the process proceeds to step S112 to repeat the above-described operation.

At step S113 of FIG. 4, if K is equal to N−1, that is, if the last data chunk is written on the disk #K, a full parity P is written in a random write area RWA of a disk #(K+1), and the write pointers are advanced in the disk #K and the disk #(K+1).

In this case, the full parity P is a parity generated by performing an XOR operation on all data chunks in a stripe.

In STEP 3 of FIG. 5, a third data chunk D2 is written to the first chunk of the random write area RWA of the disk #2 and the full parity P is written to a first chunk of the random write area RWA of the disk #3.

After the full parity P is normally stored, the write pointers $WP_2$ and $WP_3$ of the disk #2 and the disk #3 are advanced.

Figure 6:
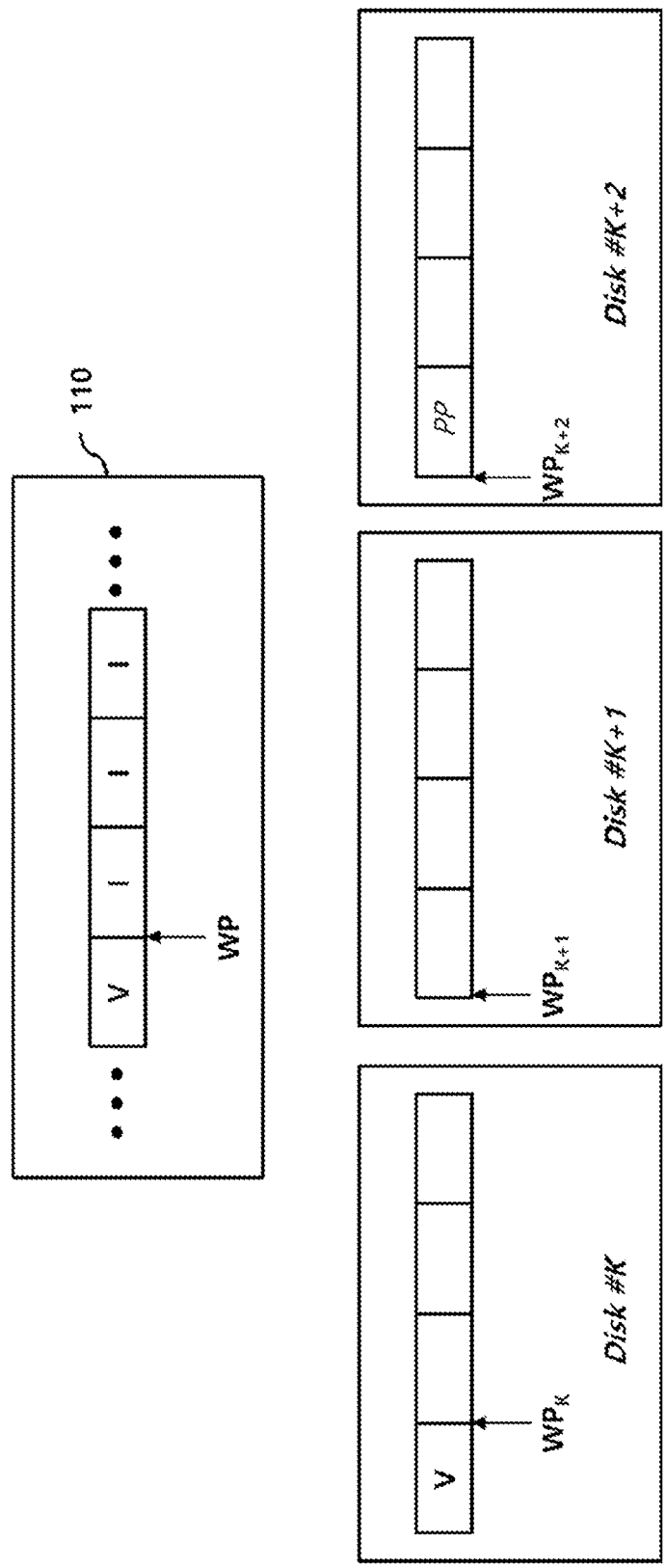
FIG. 6 illustrates a data recovery operation of a RAID controller according to an embodiment of the present disclosure.

FIG. 6 is an explanatory diagram illustrating a data recovery operation of the RAID controller 110 of FIG. 1 according to an embodiment of the present disclosure.

FIG. 6 corresponds to a state when the system of FIG. 1 is recovered or rebooted after an error such as a power failure occurs.

The RAID controller 110 manages write pointer information in the entire address space. At this time, a write pointer WP corresponding to the entire address space is referred to as an entire write pointer WP.

After an error recovery is performed, the RAID controller 110 determines a position of a write pointer WP in each disk by referring to the entire write pointer WP, so that it is possible to know the lastly stored valid data and a parity corresponding thereto.

FIG. 6 shows positions of write pointers $WP_K$, $WP_{K+1}$, and $WP_{K+2}$ for disks #K, #K+1, and #K+2, respectively.

Referring to FIG. 6, the write pointer $WP_k$ of the disk #K is advanced but the write pointers $WP_{K+1}$ and $WP_{K+2}$ for the disk #(K+1) and the disk #(K+2) are not advanced. Therefore, it can be known that a partial parity PP is stored in the disk #(K+2).

The RAID controller 110 may verify a data chunk stored in the disk #K using the partial parity PP stored in the disk #(K+2), and can check whether the entire write pointer WP and the write pointer of each disk are normally restored.

The RAID controller 110 may provide the host 200 with information about the restored entire address space and the entire write pointer WP, and the host 200 may perform an additional recovery operation as needed using the information received from the RAID controller 110.

Figure 7:
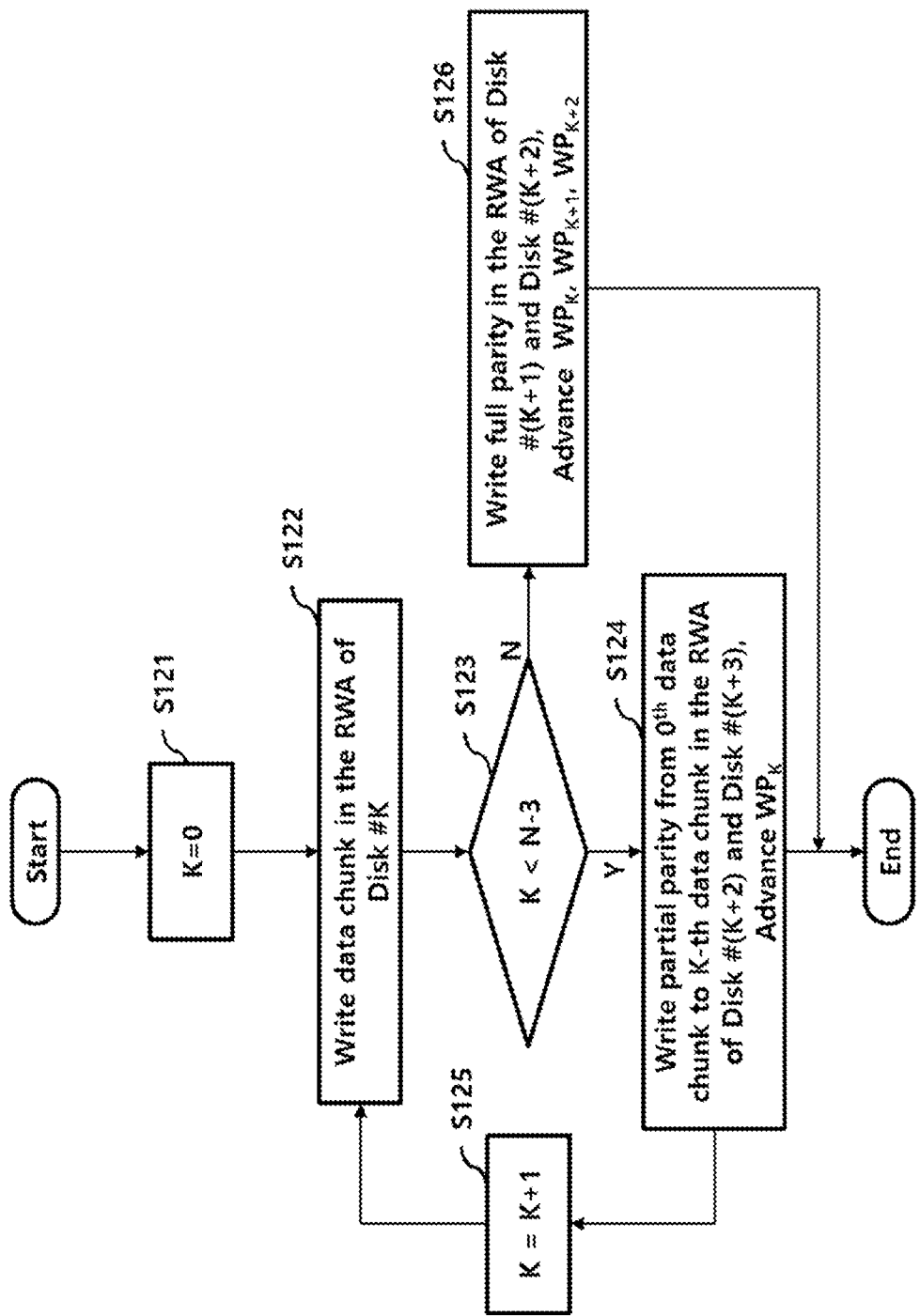
FIG. 7 is a flowchart illustrating a data write operation of a RAID controller according to an embodiment of the present disclosure.

FIG. 7 is a flowchart illustrating a data write operation of the RAID controller 110 of FIG. 1 according to an embodiment of the present disclosure.

FIG. 7 shows a write operation in a first stripe in a RAID system operating in RAID 6.

In FIG. 7, it is assumed that a total number of chunks that can be stored in one stripe is N and up to N−2 data chunks can be stored.

Figure 8:
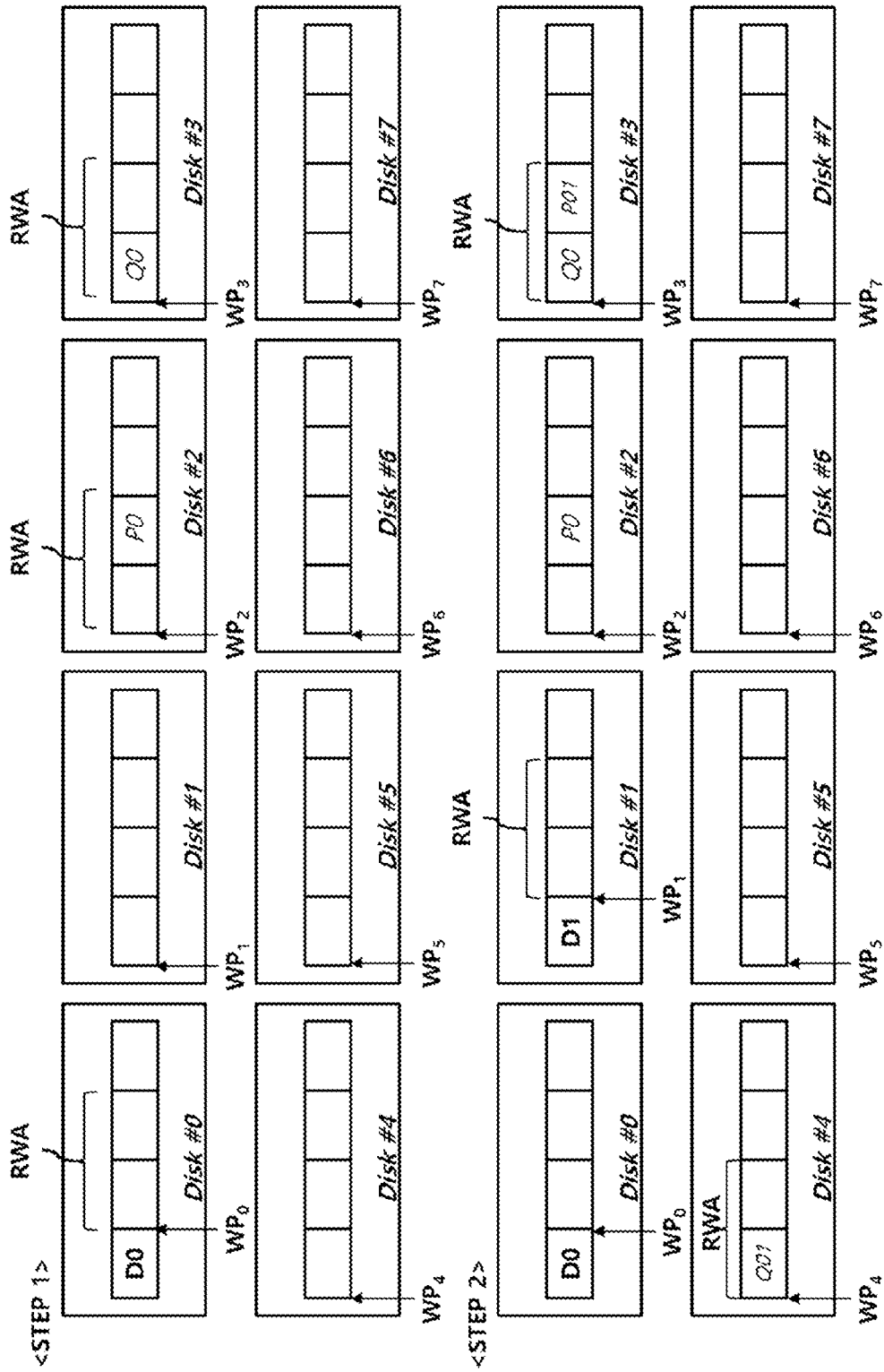
FIGS. 8 to 10 illustrate a data write operation of a RAID controller according to an embodiment of the present disclosure.
Figure 9:
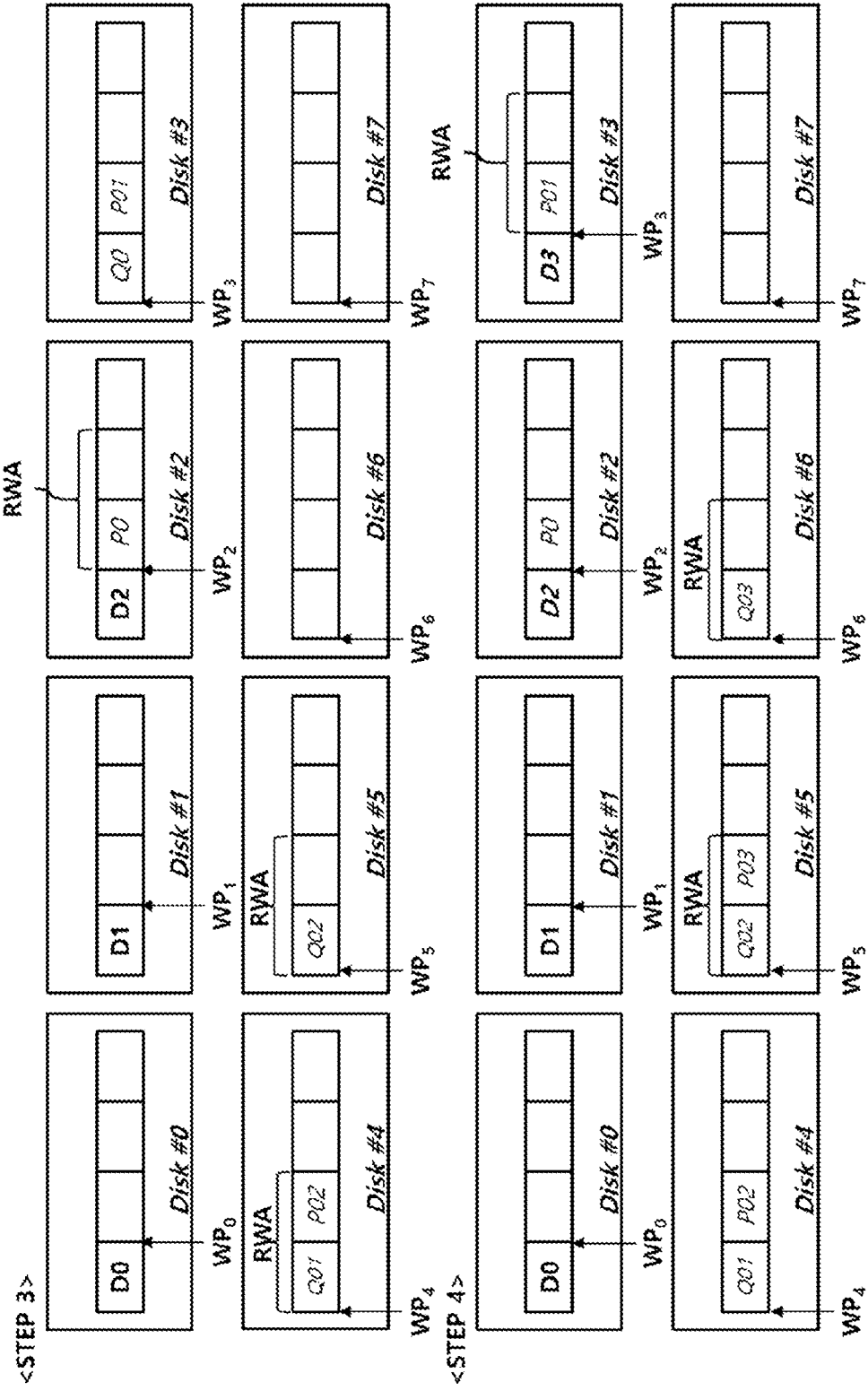
Figure 10:
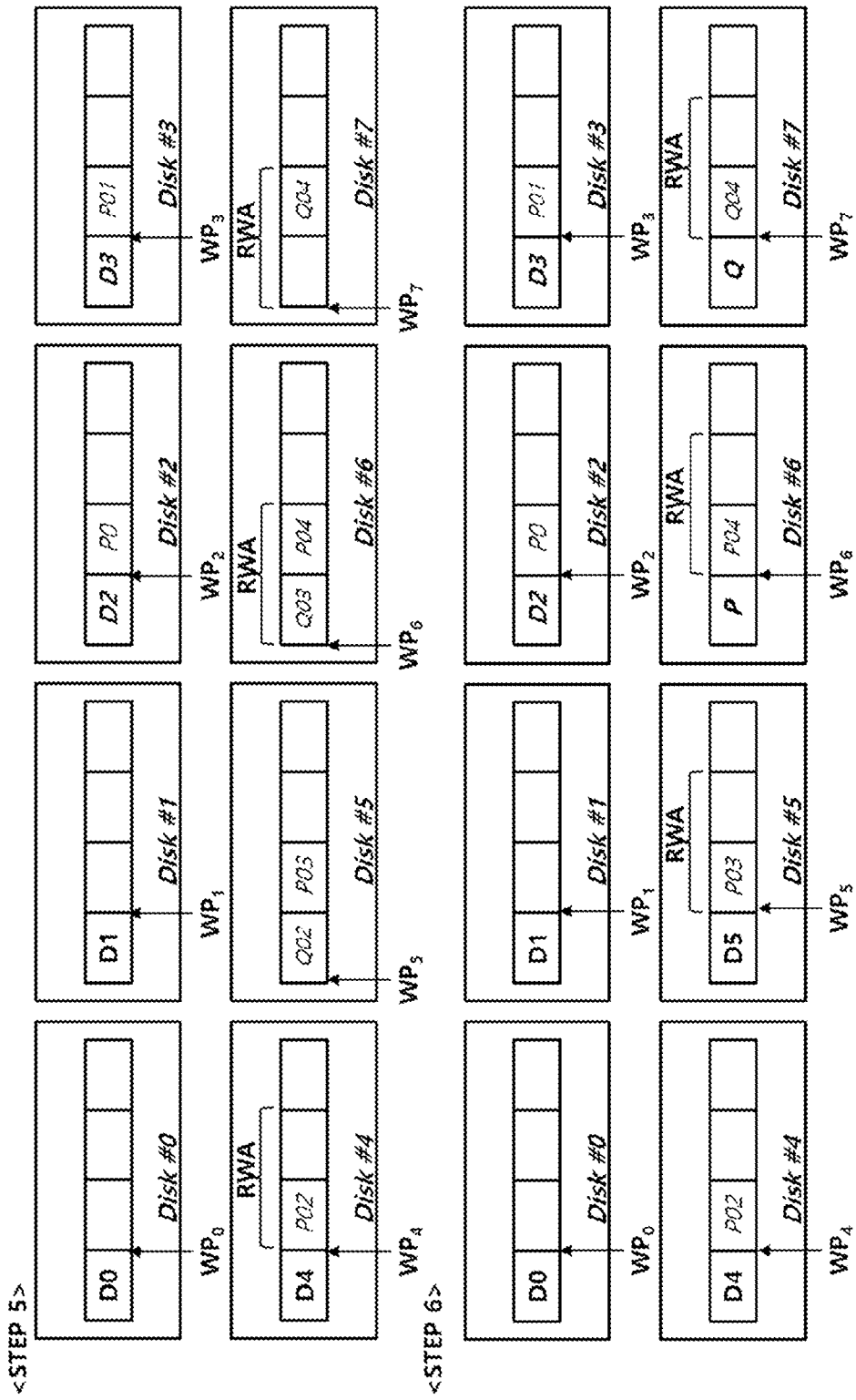

FIGS. 8 to 10 are explanatory diagrams for explaining the data write operation of FIG. 7 and correspond to a case where N is 8. Hereinafter, the data write operation of FIG. 7 will be described with reference to FIGS. 8 to 10.

First, a disk variable K is initialized to 0 at S121.

Thereafter, a data chunk is written on a disk #K at S122.

Then, it is determined whether the disk variable K is smaller than N−3 at S123.

When the disk variable K is less than N−3, a partial parity is generated and stored, and then a write pointer $W_K$ of the disk #K is advanced at S124.

The partial parity is generated by performing an operation on a data chunk #0 to a data chunk #K, and two types of parities are generated in RAID 6. Since a parity generation method in RAID 6 is well known, a detailed description thereof is omitted.

The two types of parities are indicated by a first parity P and a second parity Q, and a first partial parity and a second partial parity generated by performing an operation on the data chunk #0 to the data chunk #K are indicated as the first partial parity P0K and the second parity Q0K, respectively.

The first partial parity P0K is stored in a random write area RWA of a disk #(K+2), and the second partial parity Q0K is stored in a random write area RWA of a disk #(K+3).

When a first partial parity and a second partial parity generated in the current step are stored, a first partial parity and a second partial parity generated in the previous step are not removed. If the first or second partial parity generated in the previous step is removed, when an error occurs while storing data or a partial parity in the current step, data normally stored in the previous step is damaged and data integrity cannot be guaranteed.

As described above, in this embodiment, the size of the random write area RWA corresponds to two data chunks.

In this embodiment, the first partial parity P0K is stored in a second chunk of the random write area RWA of the disk #(K+2), and the second partial parity Q0K is stored in a first chunk of the random write area RWA of the disk #(K+3).

Referring to FIG. 8, when a data chunk D0 is stored in a first chunk of a random write area RWA of a disk #0 in STEP 1, a first partial parity P0 is stored in a second chunk of a random write area RWA of a disk #2, and a second partial parity Q0 is stored in a first chunk of a random write area RWA of a disk #3.

Referring to FIGS. 8 to 10, similar operations are performed for STEP 2 to STEP 4.

STEP 5 is the same as described above except that a storage location of a second partial parity Q04 is changed to a second chunk in a random write area RWA of a disk #7.

If the first and second partial parities are normally stored, the write pointer $WP_K$ of the disk #K is advanced.

If the write pointer $WP_K$ of the disk #K is advanced while the partial parity is not normally stored, when a failure occurs in the disk #K, the data stored on the disk #K cannot be recovered. Therefore, it is better to advance the write pointer $WP_K$ of the disk #K after the partial parity is normally stored.

In the cases of STEP 1 to STEP 5 described in FIGS. 8 to 10, the write pointer is advanced only on the disk on which the data chunk is stored, and is not advanced on the disk on which the partial parity is stored.

FIGS. 8 to 10 show a state after a write pointer is advanced in a corresponding disk.

After the write pointer $WP_K$ of the disk K is advanced at S124, the disk variable K is increased by 1 at S125, and the process proceeds to step S122 to repeat the above-described operation.

At step S123, if K is equal to N−3, that is, if the last data chunk is stored, a first full parity P is written in a random write area RWA of a disk #(K+1), and a second full parity Q is stored in a random write area RWA of a disk #(K+2), and write pointers $WP_K$, $WP_{K+1}$, and $WP_{K+2}$ are advanced in the disk #K, the disk #(K+1), and the disk #(K+2), respectively.

In STEP 6 of FIG. 10, a data chunk D5 is written to a first chunk of a random write area RWA of a disk #5, the first full parity P is written to a first chunk of a random write area RWA of a disk #6, and the second full parity Q is stored in a first chunk of a random write area RWA of a disk #7.

Write pointers $WP_5$, $WP_6$, and $WP_7$ of the disks #5, #6, and #7 are advanced after the full parities P and Q are normally written.

Figure 11:
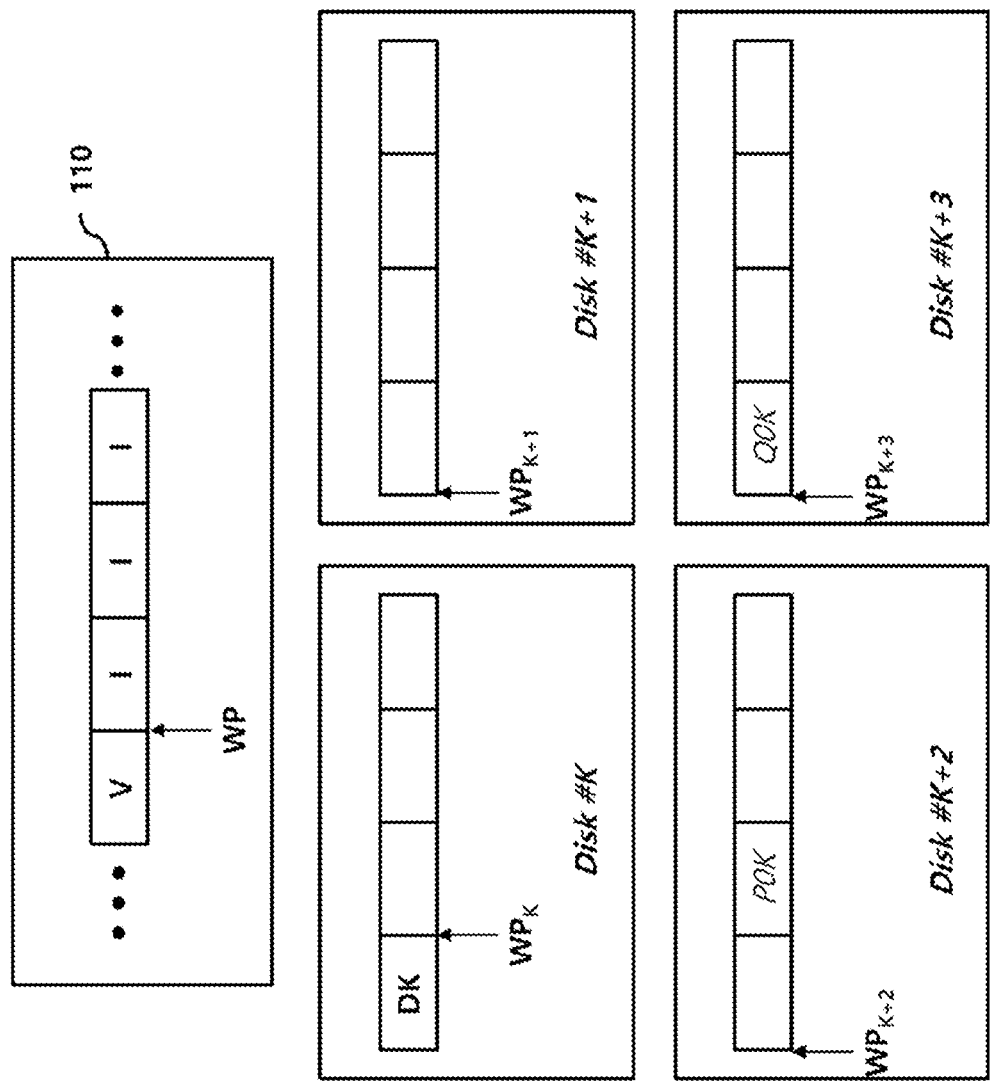
FIG. 11 illustrates a data recovery operation of a RAID controller according to an embodiment of the present disclosure.

FIG. 11 is an explanatory diagram illustrating a data recovery operation of the RAID controller 110 of FIG. 1 according to an embodiment of the present disclosure.

FIG. 11 corresponds to a state when the system of FIG. 1 is recovered or rebooted after an error such as a power failure occurs.

The RAID controller 110 manages write pointer information in the entire address space. At this time, a write pointer WP corresponding to the entire address space is referred to as an entire write pointer WP.

After an error recovery operation is performed, the RAID controller 110 determines a position of a write pointer in each disk by referring to the entire write pointer WP, so that it is possible to know the lastly stored valid data and a parity corresponding thereto.

FIG. 11 shows the recovery of the position of the write pointer for each disk.

The write pointer $WP_K$ of the disk #K is advanced, but the write pointers $WP_{K+1}$ to $WP_{K+3}$ of the disks #(K+1) to #(K+3) are not advanced. Therefore, it can be seen that the first partial parity P0K is stored in the disk #(K+2) and the second partial parity Q0K is stored in the disk #(K+3).

The RAID controller 110 may verify a data chunk stored in the disk #K using the first partial parity P0K stored in the disk #(K+2) and the second partial parity Q0K stored in the disk #(K+3), and may check whether the entire write pointer WP and the write pointer of each disk are normally restored.

The RAID controller 110 may provide the host 200 with information about the restored entire address space and the entire write pointer WP, and the host 200 may perform an additional recovery operation as needed using the information received from the RAID controller 110.

In FIGS. 6 and 11, it is assumed that the RAID controller 110 can normally read data from the disk #K where the last data chunk is stored with reference to the entire write pointer WP.

If data cannot be read from the disk #K due to a hardware failure or the like, it cannot be confirmed whether the entire write pointer WP and the write pointer of each disk are normally restored.

In the following embodiment, a method of advancing a write pointer is disclosed in case such a complex error occurs.

Figure 12:
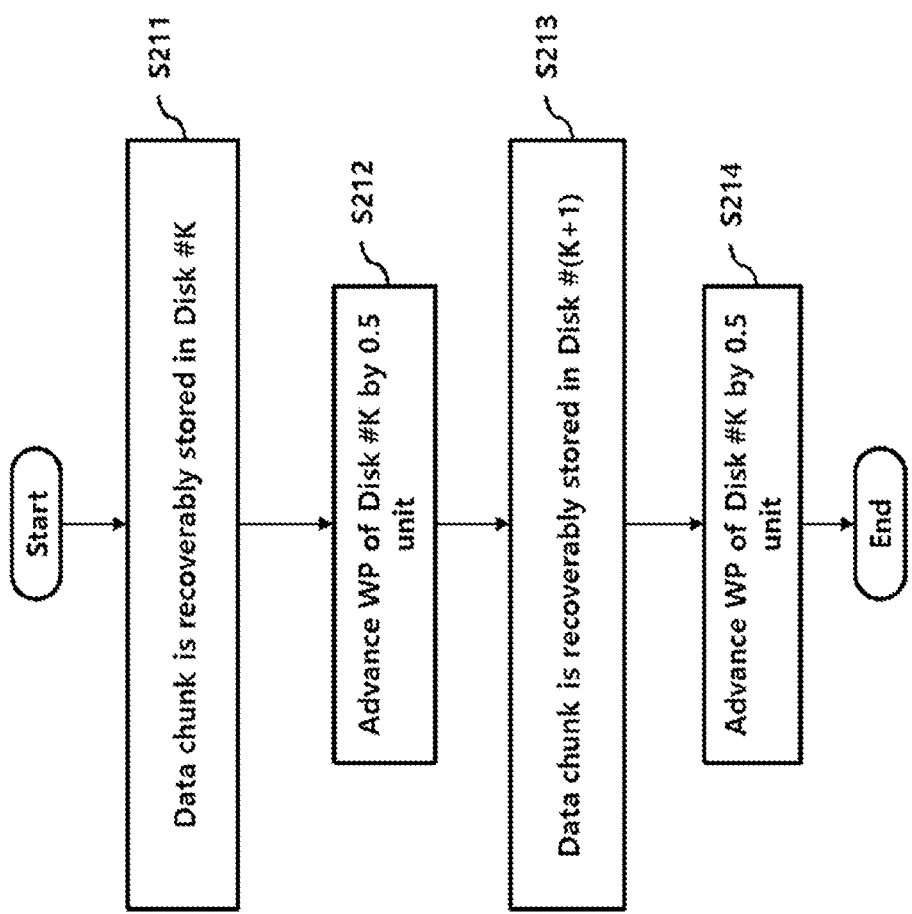
FIG. 12 is a flowchart illustrating a data write operation of a RAID controller according to another embodiment of the present disclosure.

FIG. 12 is a flowchart illustrating a data write operation according to another embodiment of the present disclosure.

More specifically, FIG. 12 relates to a method of advancing a write pointer in a disk #K.

In the embodiments of FIGS. 4 and 7, the write pointer is advanced by an amount corresponding to a size of one data chunk, which may be referred to as 1 unit.

In the embodiment of FIG. 12, the write pointer is advanced by 0.5 unit, and the advancement of the write pointer is performed considering a write operation of a subsequent data chunk.

First, a data chunk is recoverably stored on the disk #K at S211.

Recoverably storing a data chunk means that a partial parity or a full parity corresponding to the data chunk is normally stored on another disk. Since details of the recoverably storing are the same as described above, repetitive descriptions thereof will be omitted.

Thereafter, a data chunk is recoverably stored on the disk #(K+1) at S213.

Thereafter, the write pointer of the disk #K is further advanced by 0.5 unit at S214.

In this way, in this embodiment, the write pointer of the disk #K is normally advance by 1 unit after the data chunk is recoverably stored on the disk #(K+1).

Therefore, if the write pointer of the disk #K is advanced by 0.5 unit, it indicates that data is recoverably stored on the disk #K, but data is not recoverably stored on the disk #(K+1). If the write pointer of the disk #K is advanced by 1 unit, it indicates that data is recoverably stored on the disk #K and the disk #(K+1).

FIG. 13 is a flowchart illustrating a data recovery operation of the RAID controller 110 of FIG. 1 when a write operation is performed according to FIG. 12.

First, the RAID controller 110 reads the entire write pointer WP. The RAID controller 110 sets a disk on which the last data chunk is stored as the disk #K based on the entire write pointer WP.

At this time, the write pointer of the disk #K is advanced by 0.5 unit. If the write pointer of the disk #K is advanced by 1 unit, since it is determined that data is recoverably stored on the disk #(K+1), a disk on which the last data chunk is written is determined to be the disk #(K+1).

Thereafter, it is determined whether a failure occurs in the disk #K at S310.

If no failure occurs in the disk #K, it is determined that data are recoverably stored up to the disk #K as shown in FIGS. 4 and 7 at S311.

In this case, it is possible to verify and restore the lastly stored data chunk on the disk #K at S312.

If it is determined that the failure occurs in the disk #K at S320, the write pointer $WP_K$ of the disk #K cannot be read, and therefore, it cannot be verified that the disk #K is the disk on which the last data chunk was stored.

Accordingly, if the failure occurs in the disk #K, it is determined whether the write pointer $WP_{K-1}$ of the previous disk #(K−1) was advanced by 0.5 unit at S320.

For example, in the above-described embodiment, if an offset of the write pointer is not divided by 64K, it was advanced by 0.5 unit.

If the write pointer $WP_{K-1}$ of the disk #(K−1) is advanced by 0.5 unit, the data is not recoverably stored on the disk #K.

Accordingly, it is determined that data stored up to the disk #(K−1) are recoverably stored at S330.

In this case, the data of the lastly stored data chunk on the disk #(K−1) can be verified and restored at S331.

On the other hand, if the write pointer of the disk #(K−1) was not advanced by 0.5 unit, for example, if it was advanced by 1 unit, it is determined that data was recoverably stored on the disk K # at S340.

In this case, the disk #K is considered physically damaged, and the disk #K is replaced and data stored on the disk #K is reconstructed at S350. Since the disk replacement and the data reconstruction are well-known as being supported by the RAID technology, a repetitive explanation therefor will be omitted.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A data storage device comprising:
 a disk array including a plurality of disks; and
 a redundant array of independent disks (RAID) controller configured to manage the disk array according to a RAID mode,
 wherein each of the plurality of disks includes:
 a nonvolatile memory device having a plurality of zones each of which supports a sequential write operation; and
 a random write buffer associated to one of the plurality of zones, the random write buffer having a start address that is indicated by a write pointer, the write pointer indicating a location where a next write operation is to be performed,
 wherein, when the RAID controller generates and stores a parity generated for a data chunk that is currently stored in one disk among the plurality of disks, the RAID controller retains a parity generated and stored for a data chunk that was previously stored in another disk among the plurality of disks.

2. The data storage device of claim 1, wherein the random write buffer has a size equal to or greater than two times of a size of a data chunk which is a unit of a write operation.

3. The data storage device of claim 1, wherein the plurality of disks includes first, second, third, and fourth disks, and the RAID controller stores a first data chunk in a random write buffer of the first disk, stores a parity generated corresponding to the first data chunk in a random write buffer of the third disk, and updates a write pointer of the first disk.

4. The data storage device of claim 3, wherein the RAID controller stores a second data chunk in a random write buffer of the second disk, stores a parity generated corresponding to the second data chunk in a random write buffer of the fourth disk, and updates write pointers of the second disk.

5. The data storage device of claim 4, wherein when the RAID controller stores the parity generated corresponding to the second data chunk in the random write buffer of the fourth disk, the RAID controller keeps the parity generated corresponding to the first data chunk valid.

6. The data storage device of claim 1, wherein the plurality of disks includes first, second, third, fourth, and fifth disks, and wherein the RAID controller stores a first data chunk in a random write buffer of the first disk, stores a first parity generated corresponding to the first data chunk in a random write buffer of the third disk, stores a second parity generated corresponding to the first data chunk in a random write buffer of the fourth disk, and update a write pointer of the first disk.

7. The data storage device of claim 6, wherein the RAID controller stores a second data chunk in a random write buffer of the second disk, stores a first parity generated corresponding to the second data chunk in the random write buffer of the fourth disk, stores a second parity generated corresponding to the second data chunk in a random write buffer of the fifth disk, and updates a write pointer of the second disk.

8. The data storage device of claim 7, wherein when the RAID controller stores the first parity generated corresponding to the second data chunk in the random write buffer of the fourth disk and stores the second parity generated corresponding to the second data chunk in the random write buffer of the fifth disk, the RAID controller keeps the first parity and second parity generated corresponding to the first data chunk valid.

9. The data storage device of claim 1, wherein the RAID controller stores a first data chunk in a random write buffer of a first disk, stores a parity generated corresponding to the first data chunk on one of the plurality of disks, advances a write pointer of the first disk by 0.5 unit, stores a second data chunk in a random write buffer of a second disk, stores a parity generated corresponding to the second data chunk on one of the plurality of disks, and further advances a write pointer of the first disk by 0.5 unit after storing the second data chunk and the parity generated corresponding to the second data chunk, and
wherein the 0.5 unit corresponds to a half of a size of a data chunk, the data chunk being a unit of data to perform a write operation by the RAID controller.

10. The data storage device of claim 9, wherein the RAID controller manages a write pointer corresponding to an entire address space of the disk array, finds a last disk where a data chunk is lastly stored with reference to the write pointer corresponding to the entire address space after the data storage device is recovered from an error, and determines whether the last disk should be recovered or not with reference to a write pointer of a disk in which a data chunk is stored prior to the last disk when a failure occurs in the last disk.

11. The data storage device of claim 1, wherein each of the plurality of disks includes a disk controller,
wherein when the disk controller receives a request for updating the write pointer, the disk controller controls data, corresponding to the random write buffer, to be sequentially written in an unused area of a zone corresponding to the random write buffer and updates the write pointer so that the write pointer indicates a start address of the random write buffer.

12. The data storage device of claim 1, wherein the random write buffer includes a volatile memory device or a nonvolatile memory device supporting a random write operation and an overwrite operation.

13. The data storage device of claim 12, wherein the random write buffer includes a volatile memory device, and the data storage device further includes an emergency power supply device to provide a power to the volatile memory device during power failure.

14. A method of operating a data storage device including a plurality of disks, the method comprising:
writing a data chunk in a random write area of a disk corresponding to a disk variable K, K being an integer;
determining whether the disk variable K is smaller than N−1, N being a positive integer;
when the disk variable K is smaller than N−1, writing a partial parity corresponding to written data chunks in a random write area of a disk corresponding to a disk variable (K+2), advancing a write pointer of the disk corresponding to the disk variable K, increasing the disk variable K by 1, and repeating the writing of the data chunk and the determining until the disk variable K becomes equal to N−1; and
when the disk variable K is equal to N−1, writing a full parity corresponding to the written data chunks in a random write area of a disk corresponding to a disk variable (K+1) and advancing the write pointer of the disk corresponding to the disk variable K, the write pointer indicating a location of the disk corresponding to the disk variable K where a next write operation is to be performed,
wherein the partial parity represents a parity generated when an available space to store additional data chunk is left in a stripe constituted by the plurality of disks, and the full parity represents a parity generated when no available space is left in the stripe.

15. The method of claim 14, wherein a partial parity generated corresponding to a first data chunk is kept valid when a partial parity generated corresponding to the first data chunk and a second data chunk is stored, the second data chunk being written after the second data chunk is written.

16. A method of operating a data storage device including a plurality of disks, the method comprising:
writing a data chunk in a random write area of a disk corresponding to a disk variable K, K being an integer;
determining whether the disk variable K is smaller than N−3, N being a positive integer;
when the disk variable K is smaller than N−3, writing a first partial parity and a second partial parity both corresponding to written data chunks in a random write area of a disk corresponding to a disk variable (K+2) and a random write area of a disk corresponding to a disk variable (K+3), respectively, advancing a write pointer of the disk corresponding to the disk variable K, increasing the disk variable K by 1, and repeating the writing of the data chunk and the determining until the disk variable K becomes equal to N−3; and
when the disk variable K is equal to N−3, writing a first full parity and a second full parity both corresponding to the written data chunks in a random write area of a disk corresponding to a disk variable (K+1) and a random write area of a disk corresponding to a disk variable (K+3), respectively, and advancing the write pointer of the disk corresponding to the disk variable K, the write pointer indicating a location of the disk corresponding to the disk variable K where a next write operation is to be performed,
wherein the first and second partial parities represent a parity generated when an available space to store additional data chunk is left in a stripe constituted by the plurality of disks, and the first and second full parities represent a parity generated when no available space is left in the stripe.

17. The method of claim 16, wherein first and second partial parities generated corresponding to a first data chunk are kept valid when first and second partial parities generated corresponding to the first data chunk and a second data chunk are stored, the second data chunk being written after the first data chunk is written.

* * * * *